(12) United States Patent
Bo

(10) Patent No.: US 6,914,762 B2
(45) Date of Patent: Jul. 5, 2005

(54) PROTECTION OF ELECTRICAL POWER LINES

(75) Inventor: Zhiqian Bo, Bath (GB)

(73) Assignee: Alstom, Paris (FR)

( * ) Notice: Subject to any disclaimer, the term of this patent is extended or adjusted under 35 U.S.C. 154(b) by 241 days.

(21) Appl. No.: 10/311,793

(22) PCT Filed: May 3, 2002

(86) PCT No.: PCT/GB02/02077
§ 371 (c)(1),
(2), (4) Date: Dec. 19, 2002

(87) PCT Pub. No.: WO02/091541
PCT Pub. Date: Nov. 14, 2002

(65) Prior Publication Data
US 2003/0142450 A1 Jul. 31, 2003

(30) Foreign Application Priority Data
May 3, 2001 (GB) ............................................. 0110782

(51) Int. Cl.⁷ ................................................. H02H 3/00
(52) U.S. Cl. ......................................................... 361/62
(58) Field of Search ............................. 361/62, 80, 66, 361/81, 115

(56) References Cited

U.S. PATENT DOCUMENTS

| | | | | |
|---|---|---|---|---|
| 4,352,137 A | * | 9/1982 | Johns | 361/82 |
| 4,390,835 A | * | 6/1983 | Elkateb et al. | 324/539 |
| 5,825,189 A | * | 10/1998 | Johns | 324/525 |
| 5,838,525 A | * | 11/1998 | Ward et al. | 361/69 |
| 6,011,480 A | * | 1/2000 | Schweitzer et al. | 340/644 |
| 6,601,001 B1 | * | 7/2003 | Moore | 702/59 |
| 6,788,508 B2 | * | 9/2004 | Papallo et al. | 361/64 |

* cited by examiner

Primary Examiner—Brian Sircus
Assistant Examiner—James A. Demakis
(74) Attorney, Agent, or Firm—Kirschstein, et al.

(57) ABSTRACT

A method of protecting a section of a three phase power line uses superimposed current components in the power line to enable a local relay to detect operation of remote circuit breakers of remote relays in response to a fault on at least one phase of the power line. Line signal transducers output line condition signals indicative of voltage and/or current in the line near the circuit breaker, and a signal processor in the local relay processes the line condition signals to selectively produce a fault signal for opening its circuit breaker after taking account of remote circuit breaker operation.

11 Claims, 10 Drawing Sheets

US 6,914,762 B2

PROTECTION OF ELECTRICAL POWER LINES

FIELD OF THE INVENTION

This invention relates to improvements in the protection of electrical power lines.

BACKGROUND OF THE INVENTION

Applicant's previous inventions in this field are disclosed, for example, in published UK Patent Applications GB 2 341 738 A and GB 2 341 737 A, to which the reader is referred for necessary background to the present invention.

GB 2 341 738 A ("Invention A") relates to power line protection using known distance protection techniques but modified according to Invention A to operate in two different modes, namely instant and delayed operation modes. Using suitable algorithms, Invention A enables power line protection apparatus (so-called "relays") to make the decision whether to operate the associated circuit breaker(s) instantly or after a delay, depending on the system and fault conditions.

On the other hand, GB 2 341 737 A ("Invention B") relates to power line protection using known directional overcurrent techniques but modified according to Invention B to operate in an accelerated mode. Using suitable algorithms, Invention B enables relays to make an accelerated operation decision depending on system and fault conditions, therefore significantly reduce the operating time in places where known directional overcurrent relays cannot offer satisfactory performance. To achieve a successful identification of the power line section containing the fault, the algorithms take into account the level of load current in each phase.

The present invention further improves these two previous inventions in that it deals with problems presented by power lines and cables having in-zone tapped-off loads.

SUMMARY OF THE INVENTION

In one of its aspects, the invention provides a method of protecting a section of a three phase power line comprising using superimposed components of current in the power line to detect operation of remote circuit breakers in response to a fault on at least one phase of the power line.

In a further aspect, the invention provides a method of protecting a first section of a three-phase power line, said first section having local and remote ends and being joined to at least a second section at said remote end, a local fault protection apparatus and a first remote fault protection apparatus being provided at said local and remote ends respectively to establish a protected zone therebetween, and at least a second remote fault protection apparatus being provided to protect said second section, each fault protection apparatus comprising a circuit breaker, measurement means for outputting line condition signals indicative of voltage and/or current in the line near the circuit breaker, and a signal processing means adapted to process the line condition signals to selectively produce a fault signal for opening the circuit breaker in response to a fault in the line, the method being performed by the signal processing means of at least the local fault protection apparatus and being characterised by the steps of:

(A) monitoring the line condition signals to detect faults either in the protected zone or outside the protected zone; and (B) opening the circuit breaker of the local fault protection apparatus
  (i) instantly if a fault is detected in the protected zone; or
  (ii) after either a first delay or a second shorter delay if a fault is detected outside the protected zone, the first and second delays being determined by monitoring the line condition signals and choosing the first or second delay according to whether the line condition signals meet a first or a second predetermined criterion respectively.

The first criterion detects whether the first section is in balanced operation or not, and may comprise return of a current or voltage ratio to a value existing immediately before the fault, the ratio value preferably being the change in zero and negative sequence quantities with respect to a change of a positive sequence quantity.

The second criterion detects operation of a remote circuit breaker, and may comprise a current change value excursion above or below a threshold. Preferably, the current change value is that of a superimposed current component determined for an unfaulted (i.e. "healthy") phase, and preferably being derived from the expression Is=I−Id, where Is is a superimposed current signal for an unfaulted phase, I is the unfaulted phase current as measured at any instant during a cycle of the power supply, and Id is the unfaulted phase current as measured at a corresponding instant during the preceding cycle of the power supply.

The invention method preferably comprises the additional steps of defining a time window within which operation of a circuit breaker of a remote fault protection apparatus can be expected and ignoring any changes in the magnitude of an unfaulted phase current outside the time window. This facilitates correct detection of operation of the remote circuit breaker.

The invention further includes a fault protection apparatus adapted to perform a method as described above.

Further aspects of the invention will be understood from a perusal of the following text and the attached drawings.

BRIEF DESCRIPTION OF THE DRAWINGS

Embodiments of the invention will now be described by way of example only, with reference to the drawings, in which.

DETAILED DESCRIPTION OF EMBODIMENTS OF THE INVENTION WITH RESPECT TO THE DRAWINGS

Figure 1:
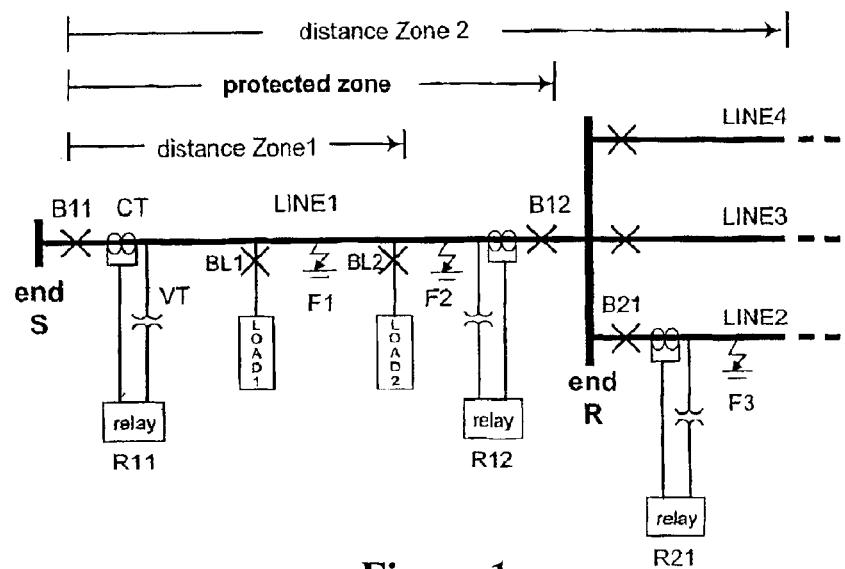
FIG. 1 is an equivalent circuit of a multi-section parallel-connected power line system with in-zone tapped-off loads, used to illustrate the invention with respect to instant and delayed modes of power line protection.
Figure 2:
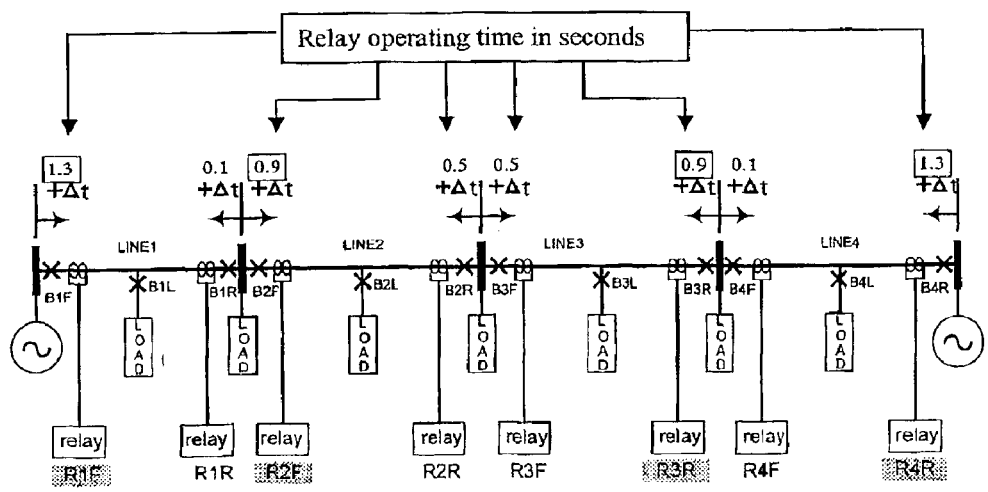
FIG. 2 is an equivalent circuit of a multi-section series-connected power line system with in-zone tapped-off loads, used to illustrate the invention with respect to an accelerated mode of power line protection.

The present invention has been devised to benefit power line systems with in-zone tapped-off load configurations as illustrated by FIGS. 1 and 2. FIG. 1 particularly relates to power line fault protection apparatus having Instant and Delayed modes of operation in accordance with the present invention and FIG. 2 particularly relates to power line fault protection apparatus having an Accelerated mode of operation in accordance with the present invention.

Instant and Delayed Operation Modes.

In FIG. 1, a multi-section parallel-connected power line system has a protected line section LINE1, with a busbar at each of its opposed ends 'S' and 'R'. The busbar at end S is connected to a source of electrical power. A power line fault protection apparatus R11 and R12 is installed at each end of the line section LINE1. Such a fault protection apparatus will be called a "relay" for the sake of brevity. Relays R11 and R12 receive line condition signals in the form of line current measurements from current transformers CT and line voltage measurements from voltage transformers VT. B11 and B12 are three phase circuit breakers represented by the symbol X. They are used to protect line section LINE1 and are considered to form part of their respective relays R11, R12 by virtue of being operatively connected thereto for reception of tripping signals. Similarly, relay R21 with its own current and voltage transformers and its own three-phase circuit breaker B21 protects line section LINE2, which is connected in parallel with line sections LINE3 and LINE4 to a busbar at end R.

It will be noted that two loads LOAD1 and LOAD2 are tapped off from LINE1, each such load being provided with its own fuse or circuit breaker BL1, BL2. Both these loads are within the protected zone and are therefore termed "in-zone tapped-off loads".

The relays R11, R12, R21 are set up as distance protection relays. As measured from end S of LINE1, relay R11 has first and second distance protection zones, Zone 1 and Zone 2, in which it is capable of detecting faults in the power line. Zone 1 may cover up to 80% of the line section LINE1, whereas Zone 2 may cover not only Zone 1 and the part of LINE1 beyond Zone 1, but also up to 50% of the shortest adjacent line section. Note that Zone 1 of relay R11 overlaps with a similar first zone (not shown) of relay R12, which extends from end R towards end S of line section LINE1. Therefore, the whole length of line section LINE1 is protected by the first zones of relays R11 and R12, and is referred to as the protected zone.

Consider the case of a fault F2 or F3 occurring close to one end of the line outside Zone 1 of relay R11, but within its Zone 2. Relays R12, R21 are close to the fault point and will quickly detect the fault and instantly trip (i.e., open) circuit breaker B12 for fault F2 on line LINE1, or circuit breaker B21 for fault F3 on line LINE2. Of course, if a fault occurs on one of the tapped-off loads, circuit breakers BL1, BL2, which have a fast operating time setting, will trip. However, the operating times of circuit breaker B12 or B21 may have to be delayed by a time Δt to allow for a fault on a tapped-off load within the protected zone, depending on the relative location of the load with respect to the time settings of the protection relays.

As in prior Invention A (GB 2 341 738 A), the instant operation mode of the present invention relies on the measurement of voltage signals and its delayed operation mode relies on the measurement of current signals. For the protected zone being considered in FIG. 1, the relay R11 at the end 'S' of the power line will first assess the severity of the fault's impact on the power line system and decide which operation mode is to be used for the fault condition, i.e., whether to instantly trip the associated circuit breakers B11, or whether to delay tripping.

Instant Operation Mode

In the instant operation mode, protection relay R11 will instantly trip its associated circuit breaker B11 for any fault F1, F2, F3 detected within its distance Zone 2. After opening the associated circuit breaker B11, relay R11 will start to detect whether or not the fault is inside the protected zone of LINE1 by identifying operation of remote or tapped-off load circuit breaker(s).

A fault within the protected zone can be assumed if the circuit breaker B12 on the protected line at the end 'R' opens and the fault condition persists after the operation. This effectively means that the remote relay R12 has detected a fault within the protected zone and has issued a trip signal to isolate the faulted line section LINE1. In this situation, relay R11 is inhibited from an immediate reclosing operation so that LINE 1 remains isolated.

Alternatively, the opening of a further remote circuit breaker which is outside the protected zone (for example, B21) or a load circuit breaker (for example, BL1) will isolate the fault from line section LINE1 and the voltage will return to balanced operating condition. In this situation, the relay R11 will issue a reclosing command and close its associated circuit breaker B11. Compared with the prior Invention A, the presence of an in-zone tapped-off load does not affect the detection of the system unbalanced condition. Hence, the principles of prior Invention A can be applied here without modification.

As mentioned above, a time delay of Δt may be introduced in this operation mode of relay R11 to give time for a load circuit breaker such as BL1 to operate for a fault on the tapped-off load section.

Delayed Operation Mode

In this mode, the relay R11 at the end 'S' will wait and detect whether the circuit breaker B12 at the remote end of the section LINE1 has tripped or not. Relay R11 will issue a tripping command to its circuit breaker B11 to isolate the protected line section LINE1 if the remote circuit breaker B12 on the protected section operates, but the fault, such as F1 or F2, is still present on the protected section. However, relay R11 will not give a tripping command if a remote circuit breaker outside the protected zone (for example, B21) or a load circuit breaker (for example, BL1) operates to isolate the fault from line section LINE1.

If prior Invention A is applied to a system without in-zone tapped-off loads, the opening of all phases of a remote circuit breaker within the protected zone of a protection relay will disconnect the line from one end, which will cause the current flow on the healthy phase to reduce to zero. However, the presence of a tapped-off load in the protected zone will sustain continuous current flow on the healthy phase from the source at end 'S' to the in-zone tapped-off load. To solve this problem, the present invention modifies the approach of prior Invention A, which is to detect the change in the magnitudes of the healthy phase current and the healthy phase superimposed currents.

To explain further, opening of the line section LINE1 at one end by tripping of the remote in-zone circuit breaker B12 will completely change the circuit configuration, resulting in a significant change in the level and angle of the healthy phase currents. Simultaneously, it will also cause a change in the signal relationship between the post-fault sequence currents, which change will occur within a short time from inception of the fault. It is on these changes that the present invention relies to detect operation of remote circuit breakers.

The time delay from inception of the fault to the opening of the remote circuit breaker will be the sum of the response time of the remote relay and the remote circuit breaker, plus the above-mentioned Δt if it is taken into consideration (here, Δt is the time taken for the load protection relay or fuse to detect a fault and open its associated circuit breaker, which is longer than the time period for the remote relay to detect the fault). Because this delay will depend to some extent on the response time of the relay and circuit breaker to different fault conditions, a time window can be pre-defined within which the operation of a remote circuit breaker can be expected. Any changes in the level of the healthy phase current outside this predefined window will be ignored. This will ensure the correct detection of the remote circuit breaker operation.

Accelerated Operation Mode

The Accelerated operating mode will now be discussed with reference to FIG. 2 and the concept of time graded fault protection using directional overcurrent relays. In FIG. 2, a multi-section series-connected power line system, in the form of a ring distribution circuit with a power source at both of its extreme ends, has a relay installed at each end of each one of four protected line sections LINE1 to LINE4. The relays are set up as directional overcurrent relays. Thus, directional overcurrent relays R1F and R1R are installed at each end of the protected line section LINE1 and receive line condition signals in the form of line current measurements from current transformers CT. Three phase circuit breakers B1F and B1R are used to protect line section LINE1 and as for FIG. 1 are considered to form part of their respective relays R1F, R1R by virtue of being operatively connected thereto for reception of tripping signals. Similarly, the other power line sections LINE2, etc., are provided with respective relays R2F, R2R, etc., each having their own current transformers and their own three-phase circuit breakers B2F, B2R, etc.

It will be noted that in addition to the loads connected to the busbars at each junction between successive line sections LINE1 to LINE4., each line section in FIG. 2 has an in-zone tapped-off load, each such load being provided with its own fuse or circuit breaker B1L, B2L, etc.

As indicated in FIG. 2, the relays are set to operate after different time delays Δt, so as to allow the appropriate circuit-breaker to open and clear the fault on its section before the relay associated with an adjacent section nearer to the source can initiate the opening of its circuit breaker. Hence, Δt increases with the stages of the protected sections. His takes account of situations where there is little difference between levels of the currents which flow for faults in different positions on the network. The relays can also monitor the direction of current flow so as to enable selective operation of the relays in response to faults which occur in different protected sections of the power line.

The relays shown in FIG. 2 are divided into two groups. The first group consists of the type of directional overcurrent relay R1R, R2R, R3F and R4F which was known before the priority date of prior Invention B (GB 2 341 737 A). These are in the faster operating time positions of the time grading scheme and are arranged to operate at fixed time delays Δt of 0.1, 0.5, 0.5 and 0.1 seconds respectively. The second group of relays R1F, R2F, R3R, R4R consists of the relays of prior Invention B, but further modified to operate in accordance with the present invention to take account of the presence of in-zone tapped-off loads. This second group of relays are in the slower operating time positions of the time grading scheme and are arranged to operate at nominal time delays Δt of 1.3, 0.9, 0.9 and 1.3 seconds respectively, but in accordance with Invention B and the present invention can operate in an accelerated mode depending on the power line system and fault conditions.

Hence, relays operating in accordance with the present invention are used together with known directional overcurrent relays, the known directional overcurrent relays being responsible for the detection of the occurrence of a fault and the invention being responsible for identification of the faulted section and facilitating accelerated operation of the circuit breaker. To achieve a successful fault section identification, a relay according to the present invention must be able to detect the magnitude of each phase load current.

For operation in the Accelerated mode, a time delay will be added to the operating time of each relay in the time graded fault protection scheme to cater for the operation of a load circuit breaker such as B1L when a fault occurs on a tapped-off load section. The magnitude of this time delay will depend on the line section to which the loads are connected, the stages of the protected load sections, and so on. The basic principle is to allow the load circuit breaker to operate first for a fault on the load section. When examining any individual line section, for example, LINE1, responses can be obtained which are similar to the above-described Delayed operation mode. To solve this problem, the present invention will also rely on detection of changes in the magnitude and angle of the healthy phase current and their associated sequence currents. In addition, the timing control technique given in prior Invention B (GB 2 341 737 A) is applied in connection with the technique for detection and identification of faulted line sections, which is described in the examples given later.

Derivation of Algorithms

Ratio signals and sequence current quantities, as derived using the two algorithms below, are used in the present invention. Derivation of sequence quantities and ratio signals are detailed in the "Protective Relays Application Guide", Third Edition, June 1987, published by GEC ALSTHOM Protection & Control Limited, and in patent specification GB 2 341 738 A.

Firstly, a ratio signal, as given in equation (1), is used as a first criterion to detect whether a system is in balanced operation or not, the ratio being the change in the zero and negative sequence quantities with respect to the change of the positive sequence quantity.

$$\text{Ratio} = \frac{S_2 + S_0}{S_1} \quad (1)$$

where $S_1$, $S_0$ and $S_2$ are sequence quantities. These may be either sequence currents or sequence voltages. Note that the analysis of fault currents and voltages in three-phase supplies using the mathematical concept of sequence components is well known in the industry per se, see "Protective Relays Application Guide" mentioned above.

Figure 3A:
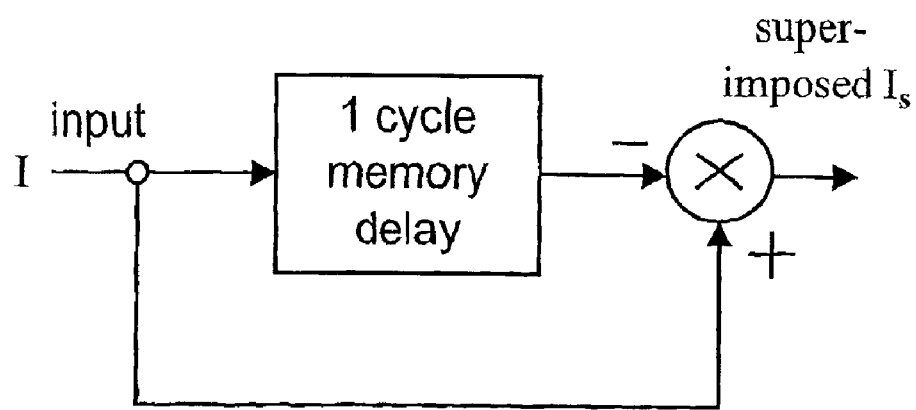
FIG. 3(a) is a diagram illustrating a technique for the derivation of superimposed current signals.

Secondly, the present invention uses a superimposed current component signal as a second criterion to detect the change in magnitude and angle of the healthy phase to determine operation of the remote circuit breaker. As shown in FIG. 3(a), the super-imposed current is derived by holding sampled current values I in memory for one cycle; and then subtracting the delayed sample from the most recent sample. The arrangement assumes that the sampling frequency is an integer multiple of the power system frequency $f_0$ and so there will be a whole number of samples taken per power cycle. If this is so, then a one cycle delay can be implemented by delaying the samples in a fixed number of memory locations. The super-imposed current signal is defined as follows:

$$Is = I - Id \quad (2),$$

where I is the healthy phase current, Id is the one-cycle-delayed healthy phase current and Is is the healthy phase superimposed current signal. These values are derived from the angle difference before and after operation of the circuit breakers. The theoretical aspect of super-imposed quantities is well documented in the literature and the reader is referred, for example, to "Power System Protection", Vol.4, "Digital Protection and Signalling", ISBN 0852968388, published by the Electricity Council of Great Britain.

Effect of Circuit Breaker Operation

Figure 3B:
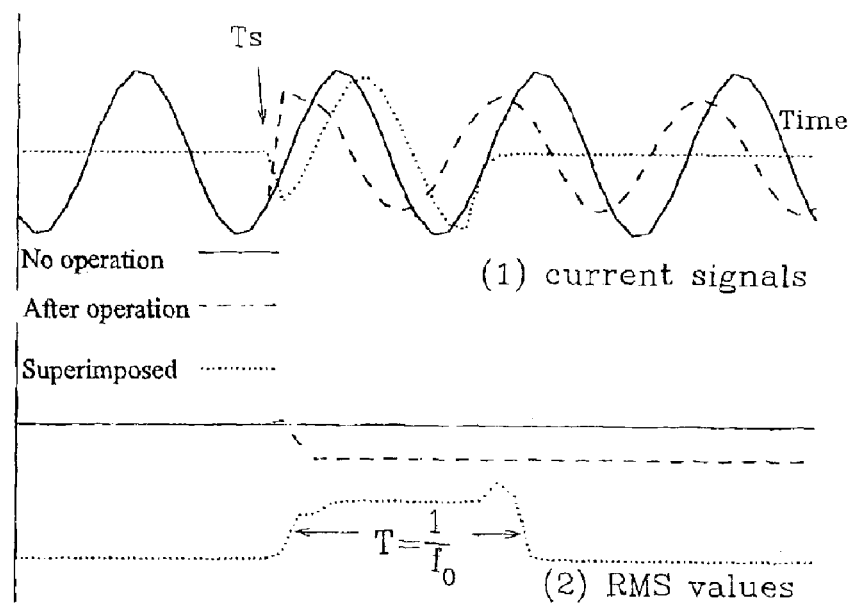
FIGS. 3(b)(1) and 3(b)(2) are graphs illustrating changes which occur in current waveforms of a single phase in a power line section due to circuit breaker operation; and all of FIGS. 4 to 9 are graphs illustrating the effects of various phase-to-earth and phase-to-phase faults on root mean square (RMS) values of selected current and voltage quantities.

FIG. 3(b) illustrates the effect of circuit breaker operation on a single phase in a power line. In FIG. 3(b)(1), the unbroken line shows the waveform of the current signal in the line section as detected by a transducer during a period when no circuit breaker operation occurred. The dashed line shows the waveform of the current signal after operation of a circuit breaker at a time Ts, its magnitude and angle having changed relative to the "no operation" state. The dotted line shows the waveform of the superimposed current signal as derived in FIG. 3(a), which has a value of substantially zero until operation of the circuit breaker and returns to zero after one cycle of the power system. FIG. 3(b)(2) plots the same "no circuit breaker operation", "after circuit breaker operation", and "superimposed" current signals in terms of their root mean square (RMS) values. It will be seen that the RMS value of the superimposed current signal rises above its base level of zero for a time T equal to the reciprocal of the power system frequency $f_0$.

In the various examples given below with reference to FIGS. 4 to 9, the fault detection performance of a relay operating in accordance with the present invention is examined in terms of its responses to different fault conditions. In the graphs of FIGS. 4 to 9, the curves labelled Ratio are Ratio signals (either current or voltage according to the example), as derived from Equation (1) above, and the curves Ibs and Ics are super-imposed current signals for phase 'b' and 'c' respectively, as derived from Equation (2) above. Furthermore, Ia, Ib and Ic represent the three phase currents; $I_1$, $I_0$ and $I_2$ represent the positive, zero and negative sequence currents, respectively; Va, Vb and Vc represent the three phase voltages; and $V_1$, $V_0$ and $V_2$ represent the positive, zero and negative sequence voltages, respectively. All are given in terms of their RMS values.

Examples for Delayed Operation Mode

FIGS. 4a to 4e and FIGS. 5a to 5e are examples demonstrating the performance of the invention in delayed operation mode, three phase operation of the circuit breakers being adopted. FIGS. 4a to 4e show the various signals for a single phase (phase 'a') to earth fault, while FIGS. 5a to 5e show them for a phase-to-phase (phases 'a' and 'b') fault.

Case 1: Single Phase to Earth Fault

Out-of-Zone Fault

Figure 4A:
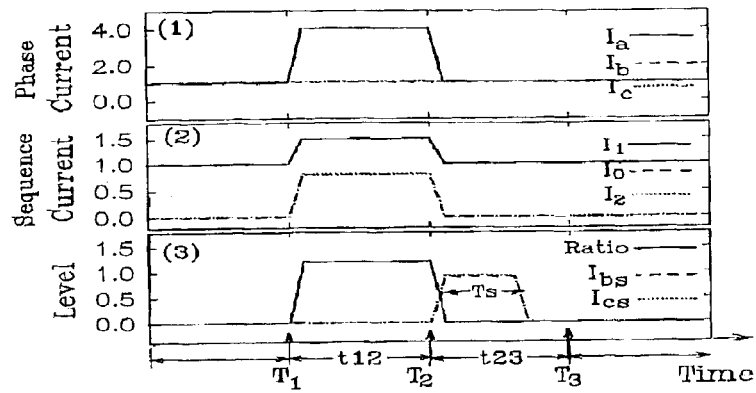

In FIG. 4a, the single phase 'a' to earth fault F3 is outside the protected zone of FIG. 1, near busbar 'R' on line section LINE2, as shown in FIG. 1. $T_1$ is the time of fault inception and $T_2$ is the time when the three phase circuit breaker B21 opens. FIG. 4a(1) shows the level of three phase current signals, 4a(2) shows the sequence current signals, and 4a(3) shows the current Ratio signal and the healthy phase superimposed current signal.

During normal balanced operation before inception of the fault, the three phase current signals Ia, Ib, Ic are of the same magnitude and the zero and negative sequence currents $I_0$, $I_2$, remain at zero. After the fault inception at time $T_1$, there is a significant increase in the faulted phase current Ia and therefore of both the negative $I_2$ and zero $I_0$ sequence currents and the Ratio signal. The relay R21 on line section LINE2 at the end 'R' detects the fault, and issues a tripping command which opens the associated circuit breaker B21. After opening of the circuit breaker B21 at time $T_2$, the fault is isolated from the protected section LINE1, and the system resumes balanced operation. Consequently, the faulted phase current Ia returns to pre-fault level and the negative and zero sequence currents and their associated Ratio signal drop back to zero as shown in FIG. 4a(2) and (3). This inhibits the relay R11 at the end 'S' from making a tripping decision for this out-of-zone fault condition. In this case, although the super-imposed currents Ibs and Ics increase to a high level caused by the remote circuit breaker operation as shown in FIG. 4a(3), it is the Ratio signal which returns zero, indicating that the system returns to balanced operation. Therefore, the fault is outside the protected zone.

Similarly, for a fault occurring on an in-zone tapped-off load section, such as LOAD 1, the operation of the circuit breaker BL1 that protects the load section will isolate the fault from the protected line section and the relay R11 will not operate.

It should be mentioned here that for the above out-of-zone condition, the pre-fault current flow does not affect relay performance. For an in-zone fault condition, however, as described below, relay operation will be significantly affected by the flow of the pre-fault current since it relies on the detection of change in level of the post-fault currents to detect the operation of the remote in-zone circuit breaker.

In-Zone Fault, Pre-Fault Current Flows from 'S' to 'R'

Figure 4B:
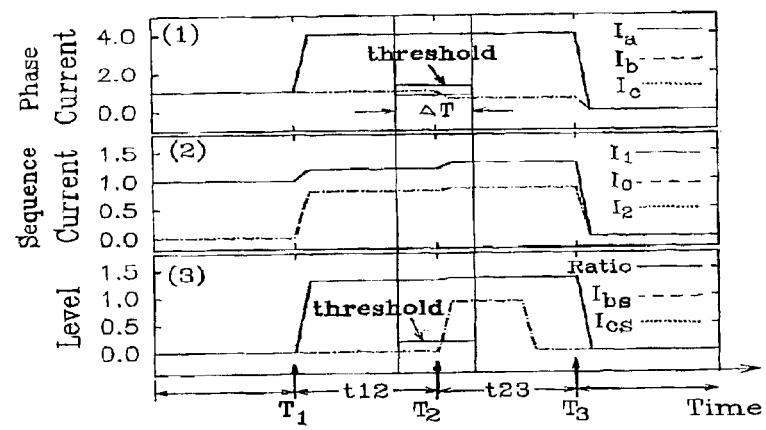

FIG. 4b shows the corresponding responses of the relay for a typical single phase-to-earth ('a'–'e') fault F2 near busbar 'R', inside the protected zone on the line section LINE1 of FIG. 1, before and after circuit breaker operations. In this example, the direction of the pre-fault current flow is from end 'S' to 'R'. $T_1$ is the time of fault inception, $T_2$ is the time when the three phase circuit breaker B12 opens, and $T_3$ the time when the three phase circuit breaker B11 opens.

The phase current and sequence current signals are shown in FIGS. 4b(1) and 4b(2) respectively. The Ratio and super-imposed current signals after the fault inception at time $T_1$ are shown in FIG. 4b(3). After opening of the remote end circuit breaker B12 at time $T_2$, the phases 'b' and 'c' of line section LINE1 becomes open circuit at end 'R'. Consequently, Ib and Ic drop to a lower level due to the change in the load condition (the source and load at the remote end 'R' have been disconnected from LINE1 by the opening of B12). However, the fault on phase 'a' has not been cleared by the remote circuit breaker operation since the fault is inside the protected zone. The faulted phase current signal Ia, the negative sequence current signal $I_2$ the zero sequence current signal $I_0$, and their associated Ratio signal, remain at high level. This change also produces superimposed current signals Ibs and Ics of the healthy phase 'b' and 'c' as shown in FIG. 4b(3). The relay R11 at the end 'S' detects both the changes in the magnitudes of the unfaulted phase currents and the super-imposed current signals through the thresholds set as shown in both FIGS. 4b(1) and 4b(3). At the same time, the Ratio signal remains at a high level, which means the system is still in an unbalanced operating condition. Hence, relay R11 can detect the operation of remote circuit breaker B12 inside the protected zone for this in-zone fault condition. Consequently, relay R11 issues a tripping command and circuit breaker B11 opens to isolate the faulted line section LINE1 at time $T_3$.

In the present invention, the relay R11 detects the operation of the remote circuit breaker B12 within a short time window ΔT after the fault inception, as shown in FIG. 4b, which is the response time of the remote relay B12 without taking Δt or the predefined Δt into consideration, or the response time of the circuit breaker. Any disturbance by various causes outside the predefined time window will not be taken into consideration by the relay, so ensuring correct operation can be obtained for various system and fault conditions.

As shown in the FIG. 4b, the time delay from fault inception at time $T_1$ to opening of the circuit breaker B11 at time $T_3$ mainly consists of two time periods, t12 and t23.

t12 consists either of the time period from fault inception to operation of circuit breaker B12, which is the time taken by relay R12 to detect the presence of a fault (this normally takes about one power frequency cycle), or a predefined Δt and the time taken for circuit breaker B12 to open (this normally takes between one to three cycles depending on the circuit breaker used).

t23 consists of the time taken for the relay R11 to identify the operation of breaker B12 plus the response time of the circuit breaker B11. If the circuit breaker operates without a delay, the time taken from fault inception to the opening of breaker B11 at the end 'S' will be the same as the time period t12. Therefore, the total time delay for the delayed operation mode will be the time t23, which is approximately 2 to 4 cycles depending on the circuit breaker used.

In-Zone Fault, Pre-Fault Current Flows from 'R' to 'S'

Figure 4C:
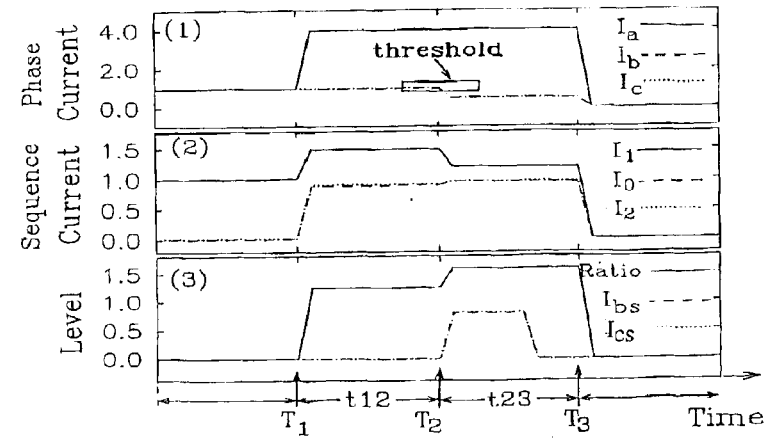

In FIG. 4c the earth fault is inside the protection zone in FIG. 1, with the pre-fault current flowing from end 'R' to end 'S', where $T_1$ is the time of fault inception; $T_2$ is the time when the three phase circuit breaker B12 opens and $T_3$ the time when the three phase circuit breaker B11 opens.

FIG. 4c shows the responses of the apparatus for the same in-zone fault condition as that in the above example. The difference is that in the present example the direction of the pre-fault current flow is from end 'R' to 'S'. As shown in FIG. 4c(1), after opening the remote in-zone circuit breaker B12, the unfaulted phase currents Ib and Ic again drop to a lower level. This is due to the removal of the power supply from the remote end 'R'. Consequently, there are slight differences in the changing of the levels of the signals in the sequence currents and their angles when compared with the previous case. Nevertheless, the changes in the magnitudes of the unfaulted phase current and the super-imposed current signals are greater than the predefined threshold as shown in the Figures, which enables relay R11 to detect the internal fault condition and consequently issue a trip command to open the circuit breaker B11 to isolate the faulted line section LINE1 at time $T_3$.

Figure 4D:
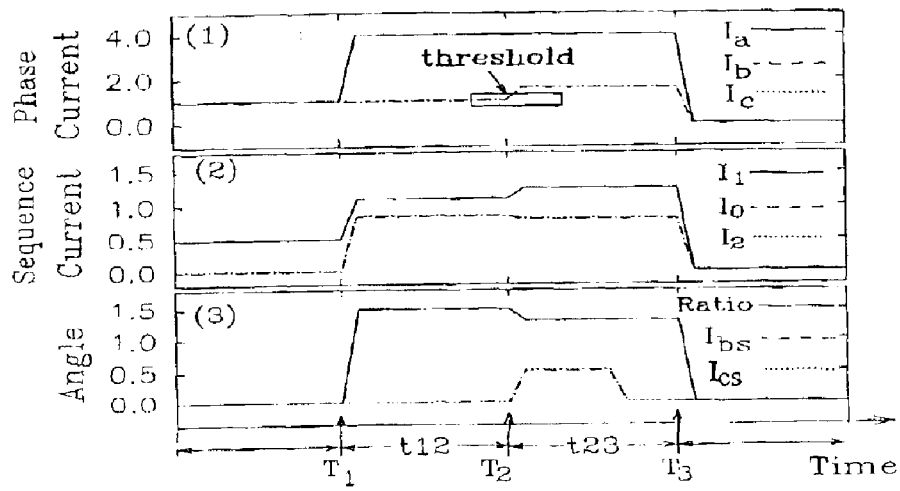

In-Zone Fault, Pre-Fault Current Flows from both Ends 'S' and 'R' to the In-Zone Tapped-Off Load FIG. 4d shows the responses of the relay when the earth fault is inside the protected zone in FIG. 1, with the pre-fault current flowing from both end 'S' and end 'R' to an in-zone tapped-off load, where $T_1$ is the time of fault inception; $T_2$ is the time when the three phase circuit breaker B12 opens and $T_3$ the time when the three phase circuit breaker B11 opens.

As shown in FIG. 4d(1), and in contrast to the previous examples, there is an increase in the unfaulted phase current $I_b$ and $I_c$ after opening of the remote in-zone circuit breaker B12. In the pre-fault period, the current flows to the in-zone tapped-off load from both ends 'S' and 'R'. After opening of the remote circuit breaker at end 'R' and consequent removal of the power supply from the end 'R', the current will flow to the in-zone tapped-off-load from end 'S' alone. Consequently, the load current seen from end 'S' will increase to compensate the loss of current from end 'R' and there are slight differences in the changing levels of the sequence currents and their angles. In this case, the magnitudes of the super-imposed current signals may not be as high as shown in FIG. 4d(3), due to the system power flow condition. However, the changes in the magnitudes of both the unfaulted phase current are obvious and well above the threshold as shown in FIG. 4d(1); therefore, relay R11 detects the change and gives the correct response.

Figure 4E:
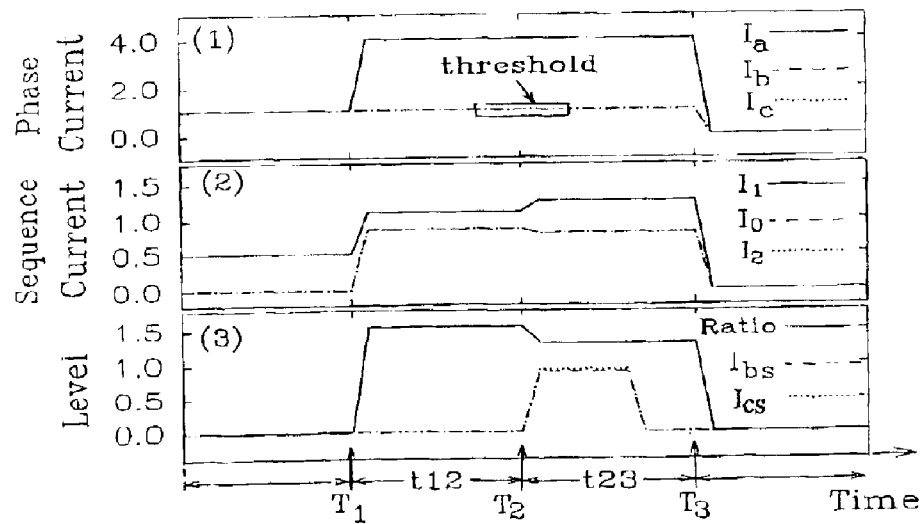

In-Zone Fault: No Cage in Magnitude of Current Flow at End 'S' After Opening of Remote Circuit Breaker FIG. 4e shows the responses of the protection relay when the earth fault is inside the protected zone in FIG. 1, where $T_1$ is the time of fault inception; $T_2$ is the time when the three phase circuit breaker B12 opens and $T_3$ the time when the three phase circuit breaker B11 opens.

This is a special case of the examples given in FIGS. 4b and 4c. The current flows from 'S' to 'R' or 'R' to 'S' before the opening of the remote circuit breaker. After the opening of the remote circuit breaker, the current flows from 'S' to the load alone. Unlike any of the previous cases, there is little change in the level of the unfaulted phase currents $I_b$ and $I_c$ after opening the remote in zone circuit breaker B12. As shown in FIG. 4e(1), this makes detection of the remote circuit breaker operation impossible if such detection were to be based on the threshold set for the unfaulted phase current. However, the magnitudes of the superimposed current signals are significantly high, as shown in FIGS. 4e(2) and 4e(3). This is because there is a significant change in the current flow condition after opening of the remote circuit breaker. Hence, the angles of the current signals have changed. The superimposed signals are well above the threshold, as shown in FIG. 4e(3), which enables relay R11 to detect the opening of the remote in-zone circuit breaker B12 and open its associated circuit breaker B11 at time $T_3$ to isolate the faulted line section LINE1.

Case 2: Phase-to-Phase Fault

Out-of-Zone Fault

Figure 5A:
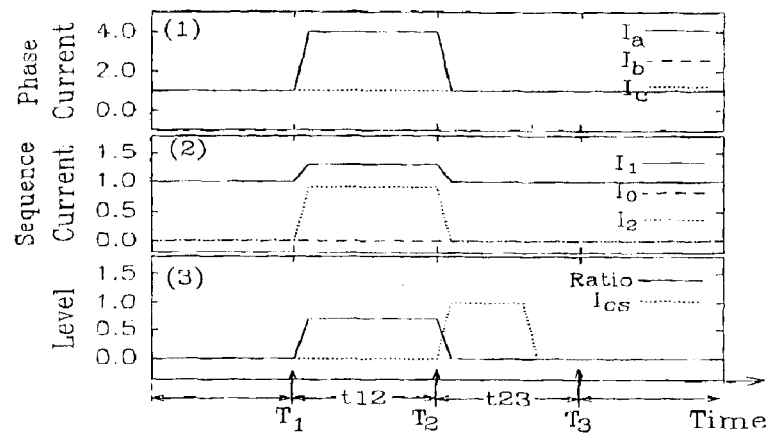

FIG. 5a shows the responses for a phase-to-phase (phases 'a'–'b') fault outside the protected zone in FIG. 1, close to busbar 'R' on line section LINE2, where $T_1$ is the time of fault inception and $T_2$ is the time when the three phase circuit breaker B21 opens.

As shown in FIG. 5a(1), the system enters an unbalanced operation condition after the fault inception at time $T_1$. There are significant increases in both faulted phase currents Ia and Ib as shown in FIG. 5a(1), where the graphs of Ia and Ib are substantially coincident. As expected, the zero sequence current $I_0$ in FIG. 5a(2) is kept at zero because the fault does not involve earth. The opening of circuit breaker B21 at time $T_2$ clears the fault on line section LINE2, the fault is isolated from the section LINE1, and the fault-associated negative sequence current $I_2$ drops to zero. Although the superimposed current Ics increases to a high level due to the operation of circuit breaker B21, the Ratio returns to zero as shown in FIG. 5a(3) and the system then returns to a balanced operating condition, which inhibits the relay R11 at the end 'S' from making a tripping decision.

In-Zone Fault, Pre-Fault Current Flows from 'S' to 'R'

Figure 5B:
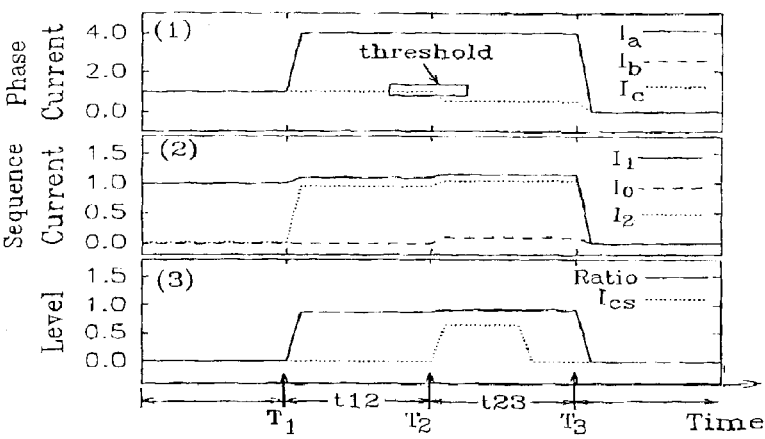

In FIG. 5b the phase-to-phase fault is inside the protected zone in FIG. 1, with the pre-fault current flowing from end 'S' to end 'R', where $T_1$ is the time of fault inception, $T_2$ is the time when the three phase circuit breaker B12 opens and $T_3$ the time when the three phase circuit breaker B11 opens.

As shown in FIG. 5b(1), the opening of the circuit breaker B12 at time $T_2$ does not clear the fault on line section LINE1 and the unfaulted phase current Ic drops to below the predefined threshold due to the opening of the circuit breaker B12. At the same time, the Ratio signal remains high and the super-imposed currents, as clearly shown in FIG. 5b(3), are also well above the threshold. Therefore, the relay R11 detects this in-zone fault condition and issues a tripping command to open the circuit breaker B11 at time $T_3$, so isolating the faulted section LINE1.

In-Zone Fault, Pre-Fault Current Flows from 'R' to 'S'

Figure 5C:
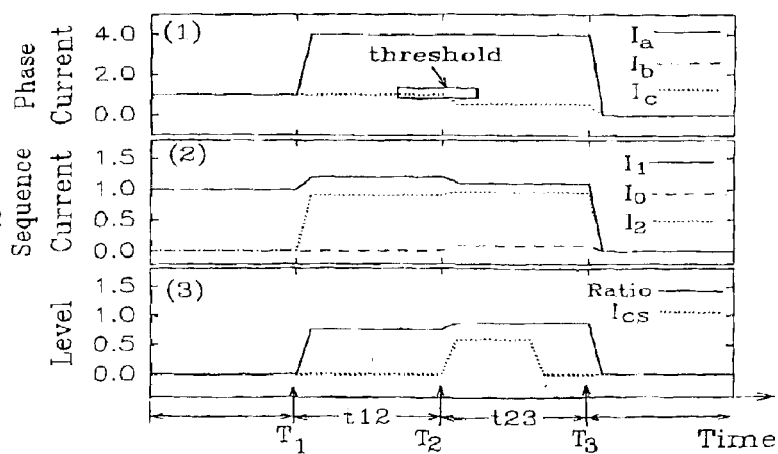

In FIG. 5c the phase-to-phase fault is inside the protected zone in FIG. 1, with the pre-fault current flowing from end 'R' to end 'S', where $T_1$ is the time of fault inception, $T_2$ is the time when the three phase circuit breaker B12 opens and $T_3$ the time when the three phase circuit breaker B11 opens.

In this example, the changes in magnitude of the unfaulted phase current Ic and the emergence of the super-imposed currents after the opening of remote circuit breaker B12 at time $T_2$ are all above the thresholds as shown in FIG. 5c(1) and 5c(3). Therefore, relay R11 detects the opening of the remote circuit breaker B12 and responds by opening its associated local circuit breaker B11 at time $T_3$.

Figure 5D:
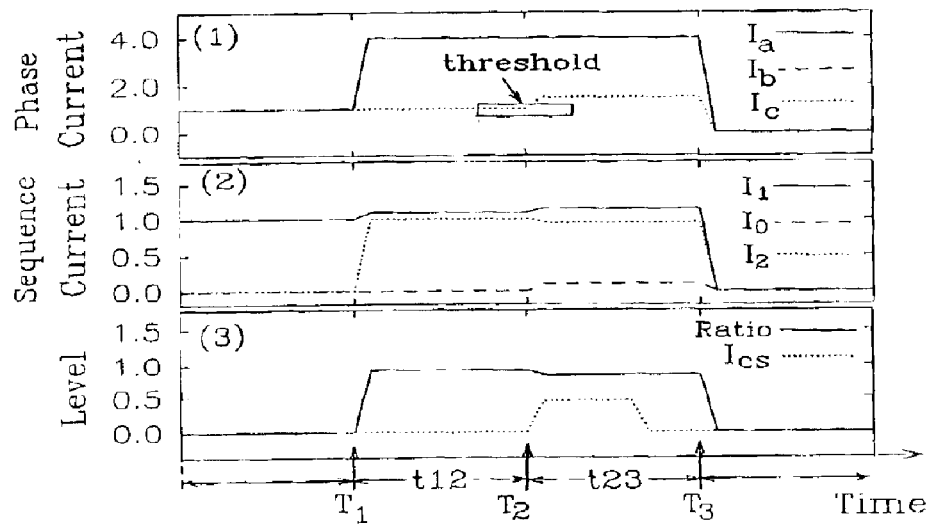

In-Zone Fault, Pre-Fault Current Flows from Both Ends 'S' and 'R' to the In-Zone Tapped-Off Load In FIG. 5d the phase-to-phase fault is inside the protected zone in FIG. 1, with the pre-fault current flowing from both end 'S' and end 'R' to the in-zone tapped-off load, where $T_1$ is the time of fault inception, $T_2$ is the time when the three phase circuit breaker B12 opens and $T_3$ the time when the three phase circuit breaker B11 opens.

As shown in FIG. 5d(1), the unfaulted phase current Ic increases after opening of remote circuit breaker R12. In this example, the super-imposed current signal Ics, which indicates the remote CB operation, may not be as high as shown in FIG. 5d(3). However, the change in magnitude of Ic as shown in FIG. 5d(1) is well above the threshold. Therefore, R11 is able to correctly detect the opening of the remote in-zone circuit breaker and give correct response for this fault condition.

In-Zone Fault: No Change in Magnitude of Current Flow at 'S' After Opening of Remote Circuit Breaker In FIG. 5e the phase-to-phase fault is inside the protection zone of FIG. 1, with the pre-fault current flowing from end 'R' to 'S', where $T_1$ is the time of fault inception, $T_2$ is the time when the three phase circuit breaker B12 opens, $T_3$ the time when the three phase circuit breaker B11 opens.

Figure 5E:
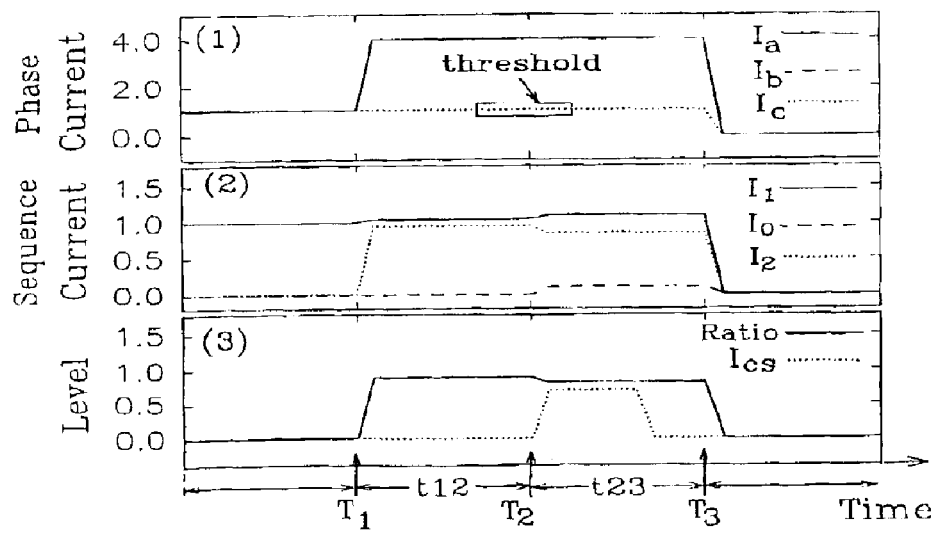

Again, as shown in FIG. 5e(1), although there is little change in the magnitude of the unfaulted phase current Ic after the opening of the remote in-zone circuit breaker B12 (which is the same situation as given in FIG. 4e), the increase of superimposed current signal Ics due to the change in signal angle is clearly evident in FIG. 5e(3). Therefore, relay R11 is able to detect the opening of the remote circuit breaker and respond correctly by opening its associated circuit breaker B11 and isolating the faulted line section LINE1.

The above are only typical examples for delayed operation mode, which outline the main situations encountered in practice. The system configuration, pre-fault current flow and fault condition may of course vary from those illustrated, however, either the changes in the magnitudes of the unfaulted phase current or angle relationship of the sequence current will be present in all different fault types. Hence, the invention relay is able to respond correctly based on the detection of these changes.

Examples for Instant Operation Mode

Some system configuration and fault conditions do not allow use of the delayed operation mode. In this situation, the apparatus can either adopt the instant operation mode only if required to, or else make an on-line decision as to which mode to use by adapting to the system and fault condition. In the instant operation mode, the instant opening of circuit breaker B11 at the end 'S' will open-circuit the line at that end and there will be no current measurement available. Therefore, in this operation mode, the invention relies on the measurement of the voltage signals for the detection and identification of remote breaker operation. This is facilitated by the installation of voltage transducers on the line side of the circuit breaker, which is normal practice in the industry.

FIGS. 6–7 are examples demonstrating the performance of an invention relay in instant operation mode using voltage measurements.

Case 3: Phase-to-Phase Fault Condition with Three-Phase Breaker Operation

Figure 6A:
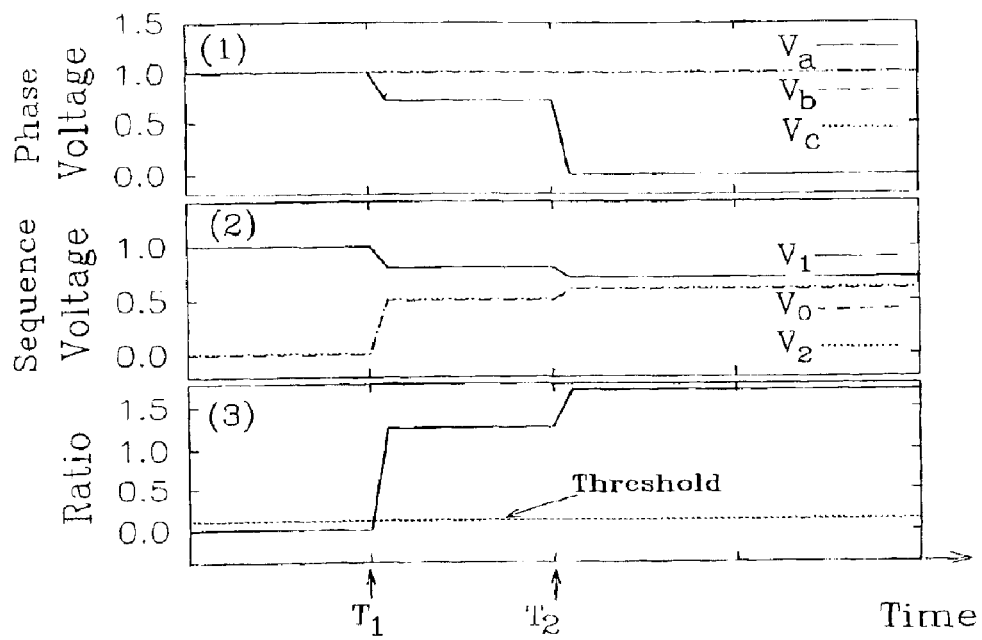
Figure 6B:
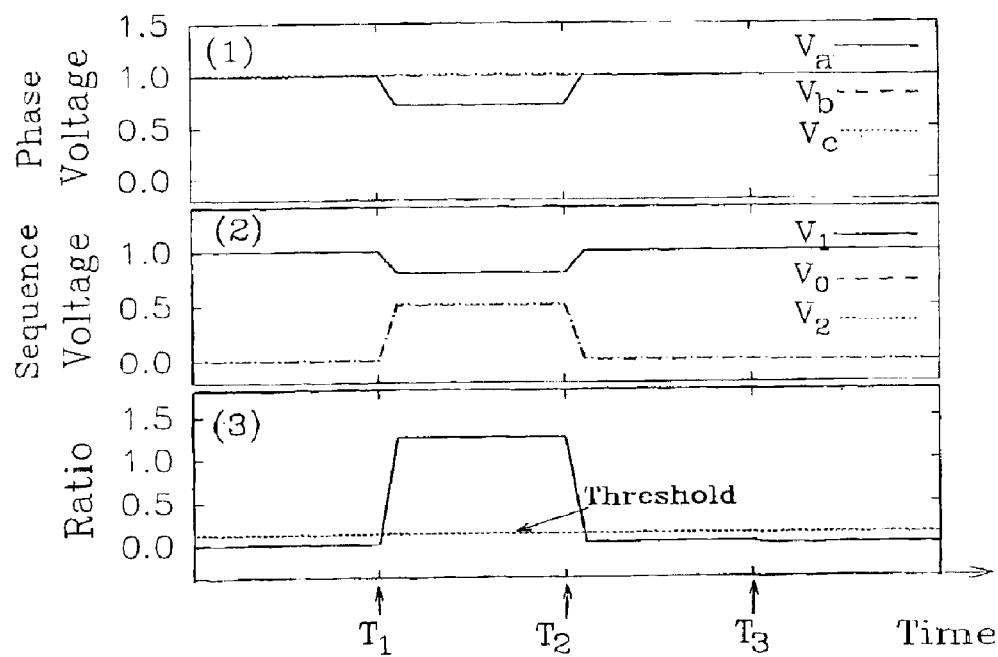

FIGS. 6a and 6b illustrate the responses of the invention relay to phase-to-phase (phases 'a'–'b') faults respectively inside and outside the protected zone of FIG. 1, three phase operation of the circuit breakers and the instant operation mode of the present invention being adopted. $T_1$ is the time of fault inception, $T_2$ is the time when the three phase circuit breakers B11 and B12 open and $T_3$ the time when the three phase circuit breaker B11 closes.

FIGS. 6a(1), 6a(2), 6b(1) and 6b(2) show the phase and sequence voltages before and after the fault with breaker operations at both ends 'S' and 'R'. For the in-zone fault example, as shown in FIG. 6a(2), there is a significant drop in the positive sequence voltage after fault inception at time $T_1$. After the opening of the circuit breakers B11 and B12 at both ends of the protected section LINE1 at time $T_2$, the sequence voltage signals drop to a level close to zero. As shown in FIG. 6a(3), the voltage Ratio signal increases to a level over the threshold after fault inception, and further increases to a very high level after the breaker opening. Consequently, the relay R11 at the end 'S' is inhibited from reclosing for this in-zone fault condition.

For the out-of-zone fault example as shown in FIG. 6b, the opening of the remote circuit breaker B21 isolates the fault from line section LINE1 and the system returns to balanced operation condition. During this period, the positive sequence voltage drops after the fault inception and returns close to its pre-fault level after the breaker opening. The negative sequence voltage $V_2$ increases after the fault inception and drops back after the breaker opening. Consequently, the voltage Ratio signal drops below the threshold, which enables the relay R11 to detect remote breaker operation and reclose its breaker B11 at end 'S' at time $T_3$.

Case 4: Single Phase to Earth Fault with Single-Phase Breaker Operation

Figure 7A:
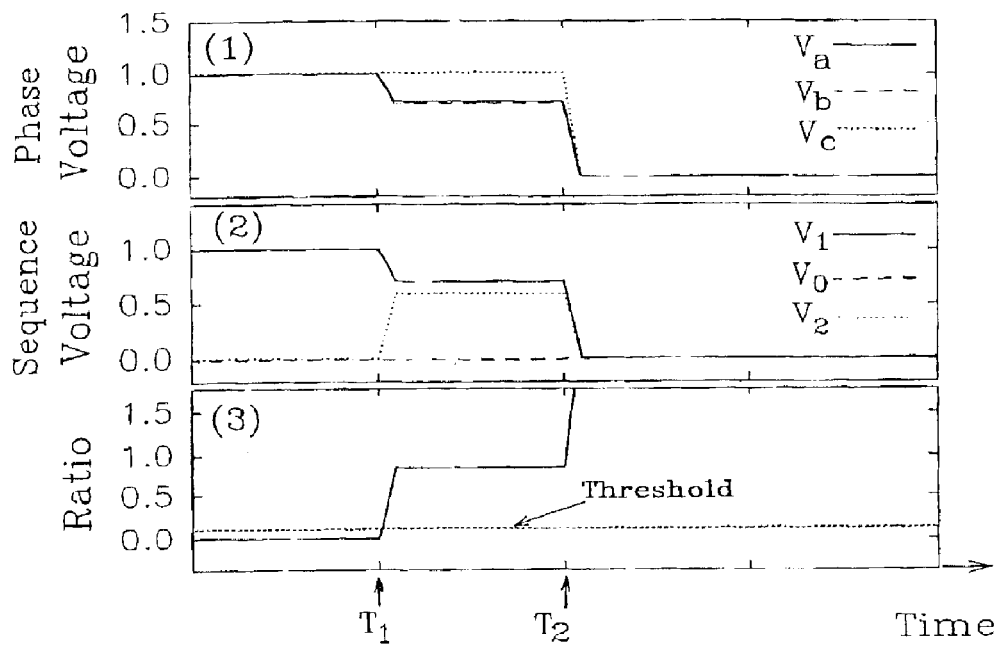
Figure 7B:
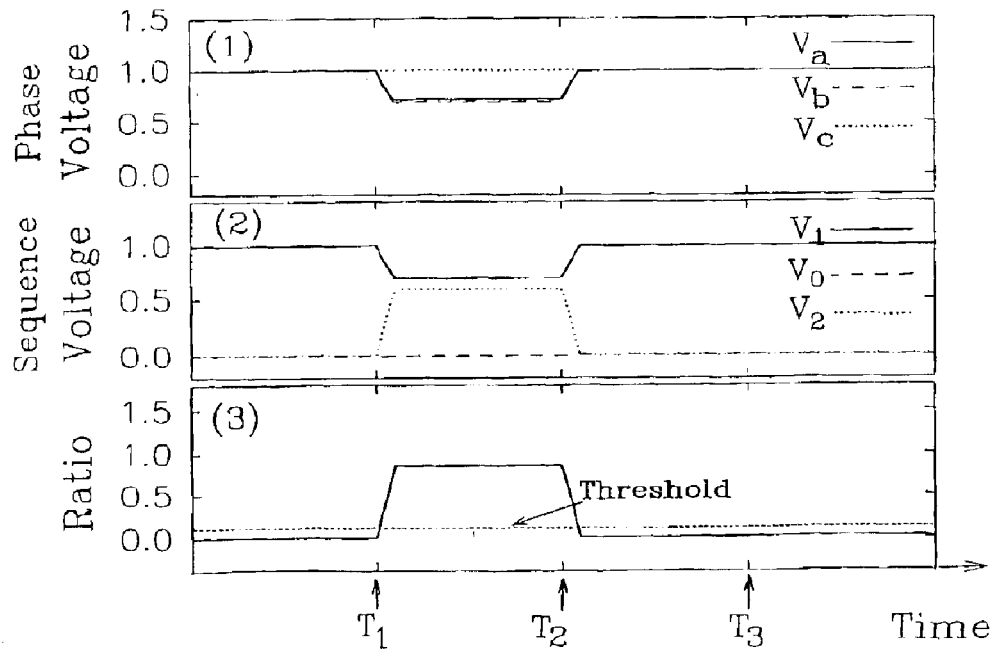

FIGS. 7a and 7b illustrate the responses of the invention relay to single phase (phase 'a') to earth faults respectively inside and outside the protected zone of FIG. 1. In both examples single phase operation of the circuit breaker is used. $T_1$ is the time of fault inception, $T_2$ is the time when the faulted phase circuit breakers B11 and B21 open and $T_3$ the time when the faulted phase circuit breaker B11 closes.

As shown in FIGS. 7a(2) and 7b(2), at time $T_2$, the faulted phase circuit breakers B11 and B12 open for the in-zone fault case, and circuit breakers B11 and B21 open for the out-of-zone fault case.

For the in-zone fault of FIG. 7a(2), since the fault still exists on the line section LINE1, this results in significantly high negative and zero sequence voltages and a sustained high level of the Ratio signal, as shown in FIG. 7a(3). Therefore, relay R11 is inhibited from making a reclosing decision.

In contrast, the system returns to a balanced condition after the clearance of the out-of-zone fault as shown in FIG. 7b(2). Consequently, the relay R11 detects this situation and issues a reclosing command to close the circuit breaker B11 at time $T_3$ and the system resumes normal operation.

G. Examples for Accelerated Operation Mode

Based on the system configuration given in FIG. 2, the following examples illustrated in FIGS. 8 and 9 are used to demonstrate the performance of the invention relay in its accelerated operation mode. In the following text, where a relay reference is shown underlined thus, R1F, this indicates that the relay is constituted in accordance with the present invention.

Case 5: Responses to Single Phase Fault

Figure 8A:
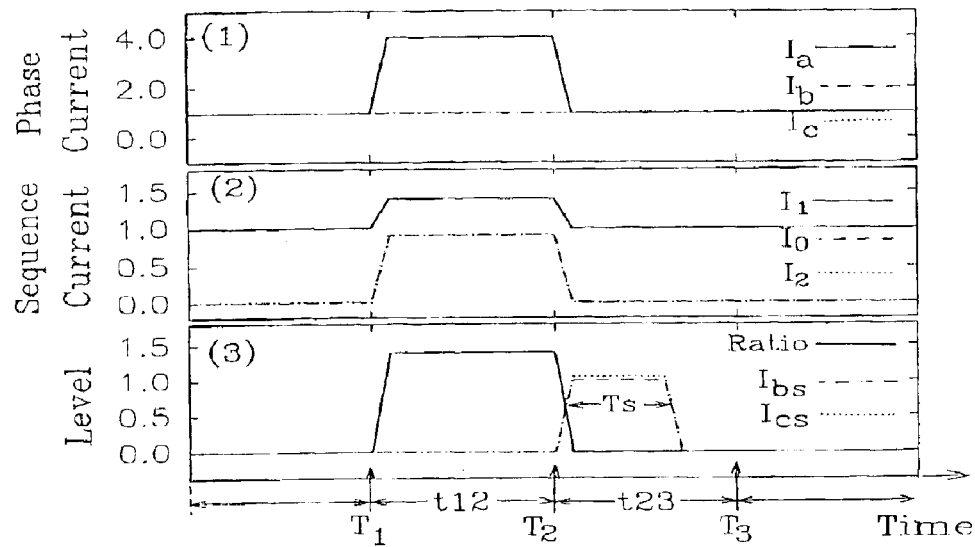
Figure 8B:
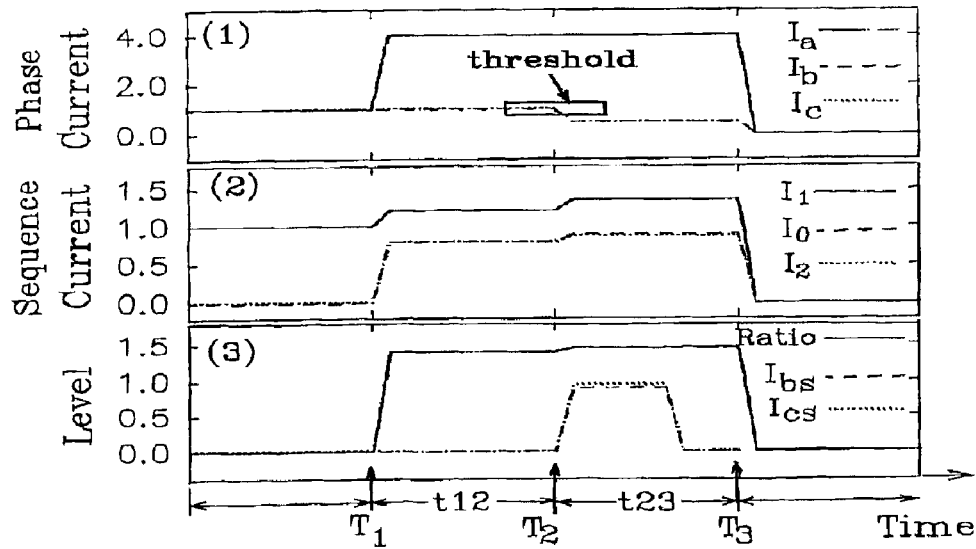

FIGS. 8a and 8b show respectively the responses of the protective relays R1F and R1R of FIG. 2 for a single phase (phase 'a') to earth fault on line section LINE1. For this fault location, the relays R1F, R1R, R2R, R3R and R4R will detect the fault as a forward direction fault relative to the location where these relays are installed. After fault inception at time $T_1$, there is a significant increase in the faulted phase current Ia as shown in FIGS. 8a(1) and 8b(1). Therefore, the negative and zero sequence current signals $I_2$, $I_0$ also increase significantly as shown in FIGS. 8a(2) and 8b(2).

The relay R1R, which has the fastest operating time setting, will make a trip decision at 0.1+Δt seconds and subsequently the circuit breaker B1R opens at the time $T_2$. After the opening of the circuit breaker B1R, the line sections LINE2, LINE3 and LINE4 are isolated from the fault. Hence, the currents measured by these relays return to a balanced operation condition and the negative and zero sequence currents and their associated Ratio signals drop back to zero, so that the relays R2R, R3R and R4R do not operate to trigger their circuit breakers. Note that the levels of the current signals may return to levels slightly different from their pre-fault values due to the change in the circuit condition after the opening of the circuit breaker B1R.

After the opening of the circuit breaker B1R, the line section LINE1 becomes open circuit at one end, the currents of the unfaulted phases 'b' and 'c' drop to a level below the predefined threshold at relay R1F location as shown in FIG. 8b(1), and the phase 'a' to earth fault is not cleared from the line section LINE1, which causes the level of the Ratio signal to stay at a high level. At the same time, there is a significant healthy phase superimposed current Ibs, Ics present as shown in FIG. 8b(3). Hence, the relay R1F detects opening of the circuit breaker B1R and makes a trip decision to open the associated circuit breaker B1F at the time $T_3$. In this way, the operating time of the relay R1F has been significantly reduced.

As shown in FIG. 8b, the time delay from fault inception at time $T_1$ to the opening of the circuit breaker B1F at time $T_3$ mainly consists of 2 time periods, t12 and t23. The first period t12 consists of the period from the fault inception to the opening of the circuit breaker B1R. This period is mainly dependent on the fixed time setting of the relay since the opening of the circuit breaker only takes a few power frequency cycles. In this fault condition, a delay of 0.1+Δt seconds is set for the relay R1R to operate. The second time period t23 consists of the time taken for the apparatus R1F to identify the operation of breaker B1R (which can be accomplished within half to one power frequency cycle), plus the response time of the circuit breaker B1F, which is approximately 2 to 4 cycles depending on the circuit breaker used. Therefore, the entire operation can be implemented within 0.2+Δt to 0.3+Δt seconds from fault inception, whereas a relay operating according to previously known schemes at location R1F will not trip until 1.3+Δt seconds.

Case 6: Responses to Phase to Phase Fault

Figure 9A:
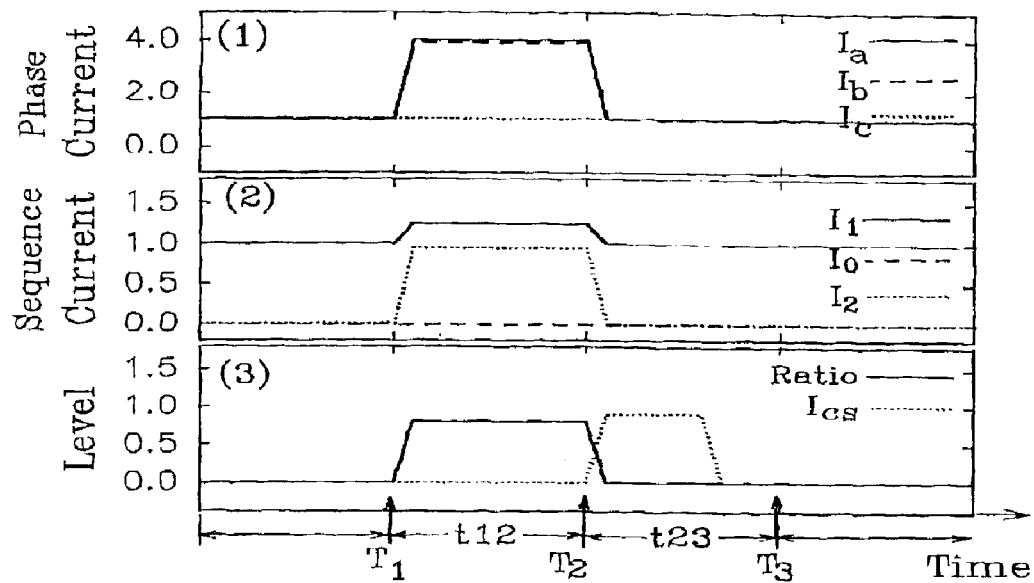
Figure 9B:
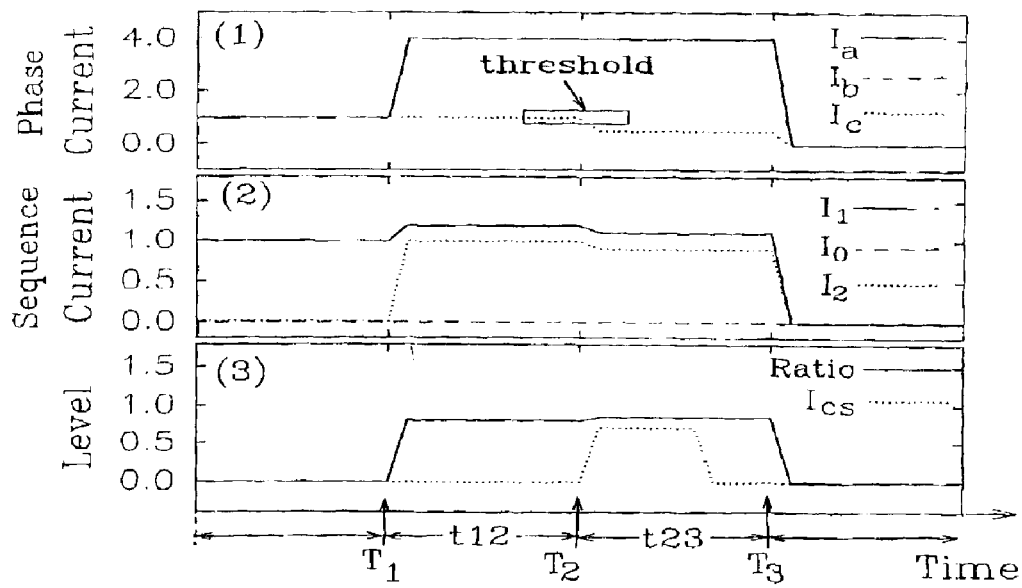

FIGS. 9a and 9b show respectively the responses of the protective relays R2F and R2R of FIG. 2 for a phase 'a' to phase 'b' fault on line section LINE2 In this fault location, the relays R1F, R2F, R2R, R3R and R4R detect a forward direction fault. As shown, there are significant increases in the faulted phase current signals Ia, Ib and negative sequence current signal $I_2$ after fault inception at time $T_1$, see FIGS. 9a(1), 9a(2) and 9b(1), 9b(2). There is no zero sequence current present since the fault does not involve earth.

The relay R2R with the fastest time setting of 0.5+Δt seconds operates first and opens the circuit breaker B2R at time $T_2$. Afterwards, the fault is isolated from the line section LINE3 and LINE4 and relays R3R and R4R do not operate their circuit breakers.

As shown in FIG. 2, for a fault on the line section LINE1, relay R1R operates to open the circuit breaker B1R within 0.5+Δt seconds after fault inception, actually at 0.1+Δt seconds. However, for a fault on line section LINE2, there will be no opening of the circuit breaker B1R within the 0.5+Δt seconds time period after fault inception and the relay R2R will operate after a 0.5+Δt seconds time delay. The relay R1F is arranged for accelerated operation only if it detects opening of the circuit breaker B1R within the 0.5+Δt second periods and it will refrain from accelerated operation after the 0.5+Δt second time delay. If there is no change in the unfaulted phase current Ic, the relay R1F detects no opening of the circuit breaker B1R within the 0.5+Δt second period from fault inception and accelerated operation of the relay R1F is prohibited.

The relay R2F, however, detects the change in the magnitude of the unfaulted phase current Ic and the superimposed current Ics through its predefined thresholds 0.5+Δt seconds after fault inception, circuit breaker B2R having been tripped by relay R2R. Subsequently, relay R2F makes a trip decision and opens its associated circuit breaker B2F at time $T_2$. In this way the faulted section LINE2 is tripped at both ends. At the same time, the line section LINE1 is isolated from the fault and the relay R1F is restrained from operation.

Note that the response of the invention relay to variations in current flow direction, as demonstrated previously, can also be applied to its accelerated mode for multi-section lines.

Observations

The levels of the phase and sequence currents and voltages shown in the graphs of all the above examples are of nominal values for demonstration purpose. The invention relay is believed to work under all values of system voltages, source parameters, and pre-fault and post-fault load flow conditions.

The equations (1) and (2) above are only examples of digital algorithms to calculate the ratio signals and superimposed current signals derived as the first and second criteria to determine system operation conditions. The invention can also be based on algorithms and criteria expressed in different forms.

As was the case in the prior Inventions A and B, no matter whether a relay is operating in an instant, delayed, or accelerated mode, the present invention does not depend for fault detection on any communication channels between relays. For example, relay R11 in FIG. 1 receives line current and line voltage measurements only from its own location on the line section LINE1, via transducers CT and VT to which it is connected. As was also the case in the prior Inventions, the operational modes are conveniently incorporated into the relays in the form of a suitably programmed microprocessor which performs the signal processing necessary to implement them. Nevertheless, the invention can also be easily implemented with other types relays such as electromechanical or static relays. The algorithms can be implemented through electromechanical or electronic circuits.

If a remote relay fails to detect a fault, or a circuit breaker fails to respond for an out-of-zone fault, the invention relay will have the function of back up protection. Under the instant operation mode, since the breaker has already opened, it will delay the reclosing operation until the remote backup protection operates to isolate an out-of-zone fault. Under the delayed operation mode, because the fault is still on the line, in most circumstances the relay will trip the line and wait for a further chance to reclose when a remote out-of-zone fault is cleared by backup protection. Alternatively, a further delay can be arranged to wait for the backup protection of the remote relay to operate. This will enable detection of whether or not a fault is inside the protected zone and correct action can then be taken.

Although the examples given herein for the instant and delayed operation are based on a single circuit system configuration, the invention can also be applied to different system configurations, such as parallel circuits or multi-end feeders.

The examples given herein are based on the use of definite time overcurrent relays only. However, the skilled person will appreciate that the invention can also be easily applied to schemes where IDMT overcurrent relays are used in time grading co-ordination.

Although the examples given herein for the accelerated operation mode are based on a four-section single circuit system configuration, the invention can also be applied to systems with more sections and different configurations.

The present invention applies to tapped-off load systems both with and, without circuit breaker or fuses associated with the loads.

What is claimed is:

1. A method of protecting a section of a three-phase power line, comprising the steps of: using superimposed current components in the power line to detect operation of remote circuit breakers in response to a fault on at least one phase of the power line; and defining a time window within which operation of a circuit breaker of a remote fault protection apparatus can be expected and ignoring any changes in the magnitude of an unfaulted phase current outside the time window, thereby facilitating correct detection of operation of said circuit breaker.

2. A method of protecting a first section of a three-phase power line, said first section having local and remote ends and being joined to at least a second section at said remote end, a local fault protection apparatus and a first remote fault protection apparatus being provided at said local and remote ends respectively to establish a protected zone therebetween, and at least a second remote fault protection apparatus being provided to protect said second section, each fault protection apparatus comprising a circuit breaker, measurement means for outputting line condition signals indicative of voltage and/or current in the line near the circuit breaker, and a signal processing means for processing the line condition signals to selectively produce a fault signal for opening the circuit breaker in response to a fault in the line, the method being performed by the signal processing means of at least the local fault protection apparatus and comprising the steps of:

a) monitoring the line condition signals to detect faults either in the protected zone or outside the protected zone; and b) opening the circuit breaker of the local fault protection apparatus
  i) instantly if a fault is detected in the protected zone; or
  ii) after either a first delay, or a second shorter delay, if a fault is detected outside the protected zone, the first and second delays being determined by monitoring the line condition signals and choosing the first or second delay according to whether the line condition signals meet a first or a second predetermined criterion respectively.

3. The method according to claim 2, in which the first criterion detects whether or not the first section is in balanced operation.

4. The method according to claim 3, in which the first criterion comprises return of a current or voltage ratio to a value existing immediately before the fault.

5. The method according to claim 4, which the current or voltage ratio value is a change in zero and negative sequence quantities with respect to a change of a positive sequence quantity.

6. The method according to claim 2, in which the second criterion detects operation of the circuit breaker of the first remote fault protection apparatus or operation of the circuit breaker of the second remote fault protection apparatus.

7. The method according to claim 6, in which the second criterion comprises a current change value above or below a threshold.

8. The method according to claim 7, in which the current change value is that of a superimposed current component determined for an unfaulted phase.

9. The method according to claim 1, in which the superimposed current components are derived from the expression $Is=I-Id$, where $Is$ is a superimposed current signal for an unfaulted phase, $I$ is an unfaulted phase current as measured at any instant during a cycle of a power supply, and $Id$ is an unfaulted phase current as measured at a corresponding instant during a preceding cycle of the power supply.

10. The method according to claim 8, in which the superimposed current component is derived from the expression $Is=I-Id$, where $Is$ is a superimposed current signal for an unfaulted phase, $I$ is an unfaulted phase current as measured at any instant during a cycle of a power supply, and $Id$ is an unfaulted phase current as measured at a corresponding instant during a preceding cycle of the power supply.

11. A fault protection apparatus for protecting a section of a three-phase power line, comprising: means for using superimposed current components in the power line to detect operation of remote circuit breakers in response to a fault on at least one phase of the power line; and means for defining a time window within which operation of a circuit breaker of a remote fault protection apparatus can be expected and ignoring any changes in the magnitude of an unfaulted phase current outside the time window, thereby facilitating correct detection of operation of said circuit breaker.

* * * * *